United States Patent
Moosavi et al.

(10) Patent No.: US 8,063,879 B2
(45) Date of Patent: Nov. 22, 2011

(54) METHOD AND HANDHELD ELECTRONIC DEVICE INCLUDING FIRST INPUT COMPONENT AND SECOND TOUCH SENSITIVE INPUT COMPONENT

(75) Inventors: Vahid Moosavi, Kitchener (CA); Steven H. Fyke, Waterloo (CA); Alexander Kornilovsky, Waterloo (CA); John Jong-Suk Lee, Thornhill (CA); Roman Rak, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 970 days.

(21) Appl. No.: 11/961,249

(22) Filed: Dec. 20, 2007

(65) Prior Publication Data

US 2009/0160761 A1     Jun. 25, 2009

(51) Int. Cl.
     *G09G 5/00* (2006.01)
(52) U.S. Cl. .................. 345/156; 345/173; 178/18.01
(58) Field of Classification Search .............. 345/156, 345/173–178; 178/18.01–18.09; 341/22
     See application file for complete search history.

(56) References Cited

U.S. PATENT DOCUMENTS

| | | | |
|---|---|---|---|
| 4,105,902 A | 8/1978 | Iwai et al. | |
| 5,053,585 A | 10/1991 | Yaniger | |
| 5,463,388 A | 10/1995 | Boie et al. | |
| 5,499,041 A | 3/1996 | Brandenburg et al. | |
| 5,627,567 A | 5/1997 | Davidson | |
| 5,675,361 A | 10/1997 | Santilli | |
| 5,748,512 A | 5/1998 | Vargas | |
| 5,812,698 A | 9/1998 | Platt et al. | |
| 5,818,437 A | 10/1998 | Grover et al. | |
| 5,953,541 A | 9/1999 | King et al. | |
| 6,023,265 A | 2/2000 | Lee | |
| 6,040,824 A | 3/2000 | Maekawa et al. | |
| 6,204,839 B1 | 3/2001 | Mato, Jr. | |
| 6,259,436 B1 | 7/2001 | Moon et al. | |
| 6,288,707 B1 | 9/2001 | Philipp | |

(Continued)

FOREIGN PATENT DOCUMENTS

EP     1197835 A2     4/2002

(Continued)

OTHER PUBLICATIONS

Notice Requesting Submission of Opinion for Korean Application No. 10-2008-0125224, Jan. 21, 2010.

(Continued)

*Primary Examiner* — Amare Mengistu
*Assistant Examiner* — Premal Patel
(74) *Attorney, Agent, or Firm* — Finnegan, Henderson, Farabow, Garrett & Dunner, LLP

(57) ABSTRACT

A handheld electronic device includes a housing having a surface; a first input component having input members disposed external to the surface; a second touch sensitive input component disposed about the input members, the touch sensitive input component being separate and distinct from the input members and the first input component and being structured to provide one of: a contact point with respect to the surface responsive to actuation of a first number of the input members, and a number of responses responsive to actuation of a second number of the input members. A processor cooperates with the first input component and the touch sensitive input component to determine if a plurality of the input members are actuated contemporaneously and to output a representation of a single one of the input members based upon one of: the contact point, and the number of responses.

6 Claims, 5 Drawing Sheets

U.S. PATENT DOCUMENTS

| | | | |
|---|---|---|---|
| 6,452,588 B2 | 9/2002 | Griffin et al. | |
| 6,489,950 B1 | 12/2002 | Griffin et al. | |
| 6,597,345 B2* | 7/2003 | Hirshberg | 345/168 |
| 6,677,932 B1 | 1/2004 | Westerman | |
| 6,727,892 B1 | 4/2004 | Murphy | |
| 6,784,874 B1 | 8/2004 | Shimizu | |
| 6,876,354 B1 | 4/2005 | Terasaki et al. | |
| 6,924,789 B2 | 8/2005 | Bick | |
| 6,943,777 B2 | 9/2005 | Muthuswamy et al. | |
| 6,996,426 B2 | 2/2006 | Granberg | |
| 7,151,528 B2 | 12/2006 | Taylor et al. | |
| 7,176,905 B2 | 2/2007 | Baharav et al. | |
| 7,808,487 B2* | 10/2010 | Taylor et al. | 345/168 |
| 7,821,502 B2* | 10/2010 | Hristov | 345/173 |
| 2002/0025837 A1 | 2/2002 | Levy | |
| 2005/0007339 A1 | 1/2005 | Sato | |
| 2005/0190970 A1 | 9/2005 | Griffin | |
| 2006/0007120 A1 | 1/2006 | Fux et al. | |
| 2006/0007121 A1 | 1/2006 | Fux et al. | |
| 2006/0176283 A1 | 8/2006 | Suraqui | |
| 2006/0192690 A1* | 8/2006 | Philipp | 341/33 |
| 2006/0202951 A1* | 9/2006 | Duarte et al. | 345/156 |
| 2007/0135104 A1* | 6/2007 | Suzuki et al. | 455/414.1 |
| 2009/0009367 A1* | 1/2009 | Hirshberg | 341/22 |
| 2009/0031219 A1* | 1/2009 | Loy | 715/700 |
| 2009/0079699 A1* | 3/2009 | Sun | 345/173 |
| 2009/0092323 A1* | 4/2009 | Qiu et al. | 382/229 |

FOREIGN PATENT DOCUMENTS

| | | |
|---|---|---|
| EP | 1 791 051 | 5/2007 |
| WO | WO 00/74240 | 12/2000 |

OTHER PUBLICATIONS

Communication from European Patent Office for European Application No. 09174482.1, Dec. 15, 2009.

The First Office Action from the State Intellectual Property Office of People's Republic of China for Chinese Application No. 200810186094.0, Mar. 1, 2010.

Sandnes, F. E., et al., "Chord level error correction for portable Braille devices", Electronics Letters, Jan. 19, 2006, vol. 42, No. 2, 2 pp.

Office Communication for Application No. 2,646,155, from the Canadian Intellectual Property Office, dated Feb. 8, 2011.

* cited by examiner

METHOD AND HANDHELD ELECTRONIC DEVICE INCLUDING FIRST INPUT COMPONENT AND SECOND TOUCH SENSITIVE INPUT COMPONENT

BACKGROUND

1. Field

The disclosed and claimed concept pertains generally to handheld electronic devices and, more particularly, to handheld electronic devices including a first input component and a separate second touch sensitive input component. The disclosed and claimed concept also pertains to methods of outputting the selection of input members of a handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices. Wireless handheld electronic devices are generally intended to be portable, and thus are of a relatively compact configuration in which keys and other input structures often perform multiple functions under certain circumstances or may otherwise have multiple aspects or features assigned thereto.

As a practical matter, the keys of a keypad can only be reduced to a certain small size before the keys become relatively unusable. In order to enable text input, however, a keypad must be capable of entering all twenty-six letters of the Roman alphabet, for instance, as well as appropriate punctuation and other symbols.

One way of providing numerous letters in a small space has been to provide a "reduced keyboard" in which multiple letters, symbols, and/or digits, and the like, are assigned to any given key. In order to enable a user to make use of the multiple letters, symbols, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, a telephone key includes the letters "ABC". If the user desires to specify the letter "C", then the user will press the key three times. While such multi-tap systems have been generally effective for their intended purposes, they nevertheless can require a relatively large number of key inputs compared with the number of characters that ultimately are output. Another example keystroke interpretation system is key chording, of which various types exist. For instance, a particular character can be entered by pressing two keys in succession or by pressing and holding a first key while pressing a second key. Still another keystroke interpretation system is a "press-and-hold/press-and-release" interpretation function in which a given key provides a first result if the key is pressed and immediately released, and provides a second result if the key is pressed and held for a short period of time.

Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous different systems have been proposed. See, for example, U.S. Patent Application Publication Nos. 2006/0007120 and 2006/0007121 assigned to the same assignee as the instant application; and U.S. Pat. No. 5,953,541. For example, as a user enters keystrokes, the device provides output in the form of a default output and a number of variants from which a user can choose. The output is based largely upon the frequency, i.e., the likelihood that a user intended a particular output, but various features of the device provide additional variants that are not based solely on frequency and rather are provided by various logic structures resident on the device.

When the key and keypad sizes shrink because of the form factor on the handheld electronic device, typing error rate increases. Hence, as the size of keypads becomes smaller and smaller, the issue of multiple key presses becomes more and more important to keypad design. One of the reasons is that the user's thumb and fingers are simply too big for the relatively small sized keys. Therefore, it becomes more likely that the user accidentally hits a nearby key, or even several keys at the same time.

On some handheld electronic devices, a key adjacent to an activated key does not respond to stimuli until a set time lag has passed. This prevents unintended sequential pressing of adjacent keys on the keypad. This time lag is one method to reduce the error rate of rapid keying; however, this relatively short delay may impede on users who are intentionally typing adjacent keys in relatively quick succession.

There is room for improvement in handheld electronic devices.

There is also room for improvement in methods of outputting the selection of input members of a handheld electronic device.

BRIEF DESCRIPTION OF THE DRAWINGS

A full understanding of the disclosed and claimed concept can be gained from the following description of the preferred embodiments when read in conjunction with the accompanying drawings in which:

Similar numerals refer to similar parts throughout the specification.

DESCRIPTION

Figure 1:
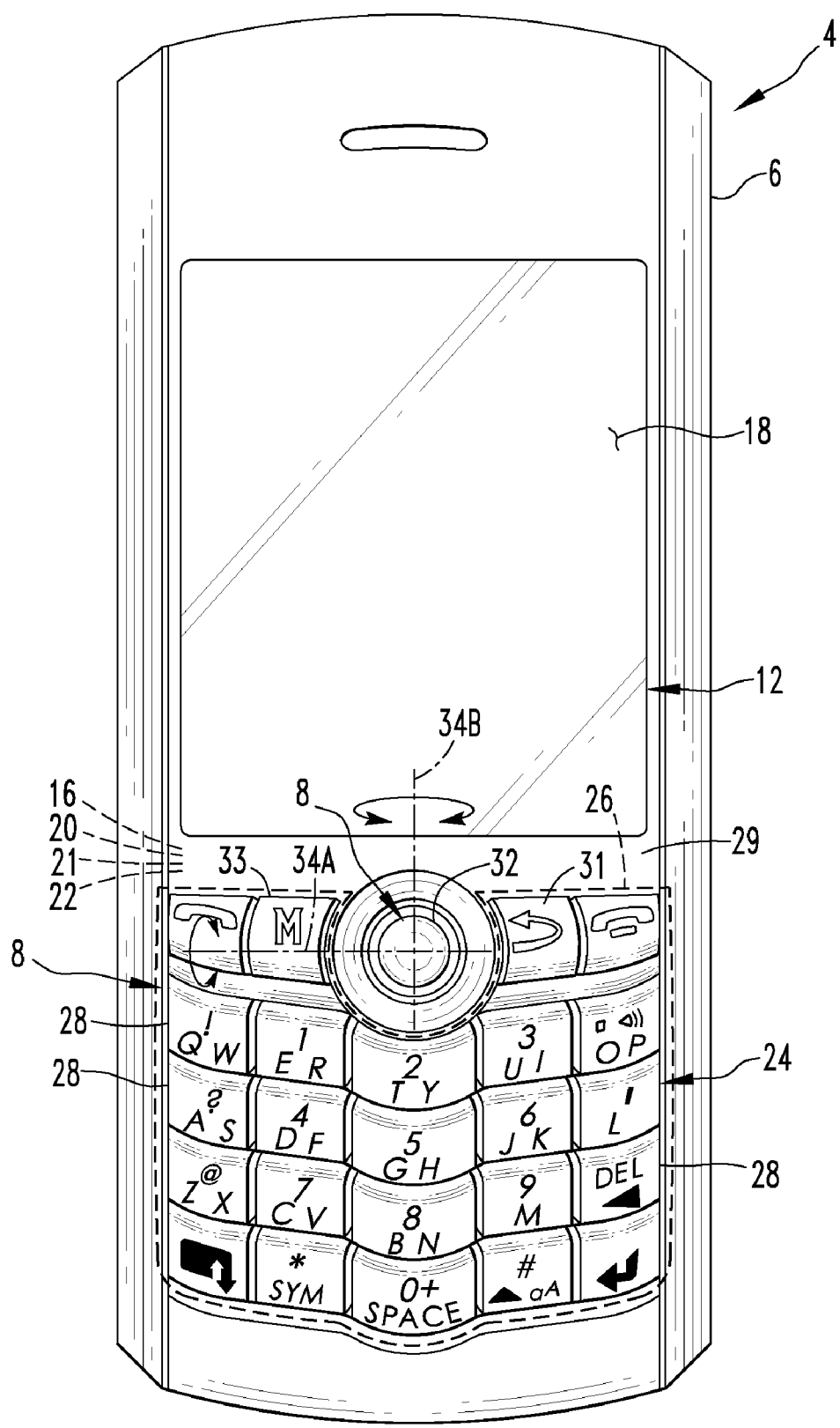
FIG. 1 is a top plan view of a wireless handheld electronic device in accordance with embodiments of the disclosed and claimed concept.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

Embodiments of the disclosed and claimed concept reduce typing error, not by increasing the effective area of the keys, not by reshaping the keys, not by increasing the space between the keys, but by allowing multiple key presses (e.g., the intended key in addition to a number of near by keys) and still being able to detect the intended key among all of the one or more pressed keys. This allows industrial designers to build a relatively smaller keypad and still keep a relatively low typing error rate.

Some embodiments of the disclosed and claimed concept employ a touchpad under the keypad to sense the exact position of the user's finger on the key. When several neighboring keys are pressed at the same time or over a very short period of time, the information from the touchpad under the keys is used to determine/guess what key the user really intended to press.

In one example embodiment, a handheld electronic device determines the user's intended key from a table using a sensed finger position from the touchpad.

In another example embodiment, information from a predictive input system, like, for example, SureType™, could also be used to determine the user's intended key when a key is pressed while the user's finger position is too close to the border between the intended key and a neighboring key.

Other example embodiments of the disclosed and claimed concept employ touch sensors on the keys of the keypad to sense the intended key of one or more pressed keys. When several neighboring keys are pressed at the same time or over a relatively short period of time, the information from the touch sensors is used to resolve what key the user really intended to press.

In accordance with one aspect of the disclosed and claimed concept, a handheld electronic device comprises: a housing including a surface; a first input component comprising a plurality of input members disposed external to the surface of the housing; a second touch sensitive input component disposed about the input members of the first input component, the second touch sensitive input component being separate and distinct from the input members and the first input component and being structured to provide one of: (a) a contact point with respect to the surface of the housing responsive to actuation of a first number of the input members, and (b) a number of responses responsive to actuation of a second number of the input members; and a processor cooperating with the first input component and the second touch sensitive input component to determine if a plurality of the input members are actuated contemporaneously and to output a representation of a single one of the input members based upon one of: (a) the contact point, and (b) the number of responses.

The second touch sensitive input component may be disposed between the housing and the input members of the first input component; the second touch sensitive input component may be structured to provide the contact point; and the processor may be structured to output the representation based upon the contact point.

The second touch sensitive input component may be disposed on each of the input members of the first input component; the second touch sensitive input component may be a plurality of touch sensors being structured to provide the number of responses; and the processor may be structured to output the representation based upon the number of responses.

The representation may be a first representation selected from the best one of the number of responses; the processor may comprise a memory, a word dictionary and a routine; the routine may be structured to provide a second representation of a first term formed from a number of previous actuations of a number of the input members and the first representation; and the routine may be further structured to output the first representation if the first term is found in the word dictionary and, alternatively, to select a third representation selected from the next best one of the number of responses, to provide a fourth representation of a different second term formed from the number of previous actuations and the third representation, and to output the third representation if the different second term is found in the word dictionary.

The second touch sensitive input component may be a touchpad; and the contact point may be a first coordinate and a second coordinate with respect to the surface of the housing.

The processor can comprise a memory including a table having, for each of the input members, a representation of a corresponding one of the input members, at least one character associated with the corresponding one of the input members, a first coordinate of the corresponding one of the input members with respect to the surface of the housing, and a second coordinate of the corresponding one of the input members with respect to the surface of the housing; the second touch sensitive input component may be further structured to provide the contact point including a third coordinate and a fourth coordinate with respect to the surface of the housing; and the processor may be structured to output as the representation of the single one of the input members the at least one character associated with the closest pair of the first and second coordinates to the third and fourth coordinates.

The processor can be structured to determine that the contact point is remote from all of the input members; and the processor may comprise a predictive input routine structured to employ an identification of the plurality of the input members that are actuated contemporaneously in order to output the representation of the single one of the input members based upon the identification.

The predictive input routine can be a disambiguation routine.

The predictive input routine can be further structured to evaluate the plurality of the input members that are actuated contemporaneously based upon at least one of: (a) a count of words being predicted from each of the plurality of the input members that are actuated contemporaneously, and (b) a measure of common usage of the words.

In accordance with another aspect of the disclosed and claimed concept, a method of outputting a selection of an input member of a handheld electronic device comprises: employing a housing including a surface; disposing a plurality of input members of a first input component external to the surface of the housing; disposing a second touch sensitive input component, which is separate and distinct from the input members and the first input component, about the input members of the first input component; providing from the second touch sensitive input component one of: (a) a contact point with respect to the surface of the housing responsive to actuation of a first number of the input members, and (b) a number of responses responsive to actuation of a second number of the input members; detecting actuation of a number of the input members; and determining if a plurality of the input members are actuated contemporaneously and responsively outputting a representation of a single one of the input members based upon one of: (a) the contact point, and (b) the number of responses.

Figure 2:
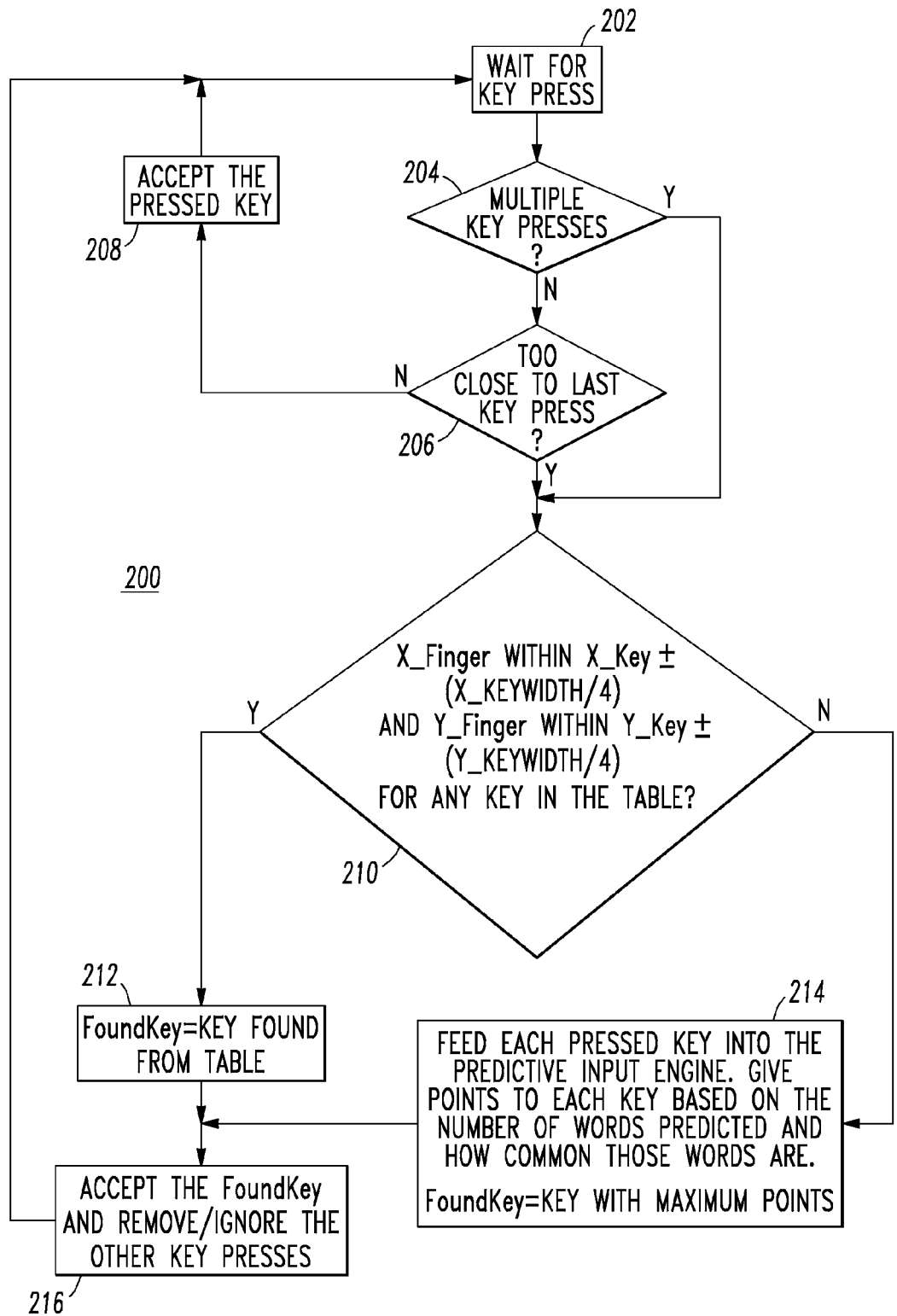
FIG. 2 is a flowchart of a keypad processing routine of the processor of the wireless handheld electronic device of FIG. 1A.

An improved handheld electronic device 4 is indicated generally in FIG. 1 and is depicted schematically in FIG. 2. The example handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used. The output apparatus 12 can also comprise a wireless transceiver 21.

As can be understood from FIG. 1, the input apparatus 8 includes a keypad 24, a touchpad 26 (shown in hidden line drawing in FIG. 1) and a multiple-axis input device which, in the example embodiment depicted herein, is a track ball 32 that will be described in greater detail below. The keypad 24 comprises a plurality of keys 28 in the example form of a reduced QWERTY keyboard, meaning that at least some of the keys 28 each have a plurality of linguistic elements assigned thereto, with at least some of the linguistic elements being Latin letters arranged generally in a QWERTY configuration. The keys 28 and the track ball 32 all are disposed on the front surface 29 of the housing 6 and serve as input members that are actuatable to provide input to the processor apparatus 16. The keypad 24 and the track ball 32 are advantageously disposed adjacent one another on the front surface 29 of the housing 6. This enables a user to operate the track ball 32 substantially without moving the user's hands away from the keypad 24 during a text entry operation or other operation.

One of the keys 28 is an <ESCAPE> key 31 which, when actuated, provides to the processor apparatus 16 an input that undoes the action which resulted from the immediately preceding input and/or moves the user to a position logically higher within a logical menu tree managed by a graphical user interface (GUI) routine 46. The function provided by the <ESCAPE> key 31 can be used at any logical location within any portion of the logical menu tree except, perhaps, at a conventional home screen (not shown). The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Another of the keys 28 is a <MENU> key 33 which, when actuated, provides to the processor apparatus 16 an input that causes the GUI 46 to generate and output on the display 18 a menu (not shown).

While in the depicted example embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by a number of routines, for example, as navigational inputs, scrolling inputs, selection inputs, and other inputs.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the handheld electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines, for example, as selection inputs, delimiter inputs, or other inputs.

Figure 1A:
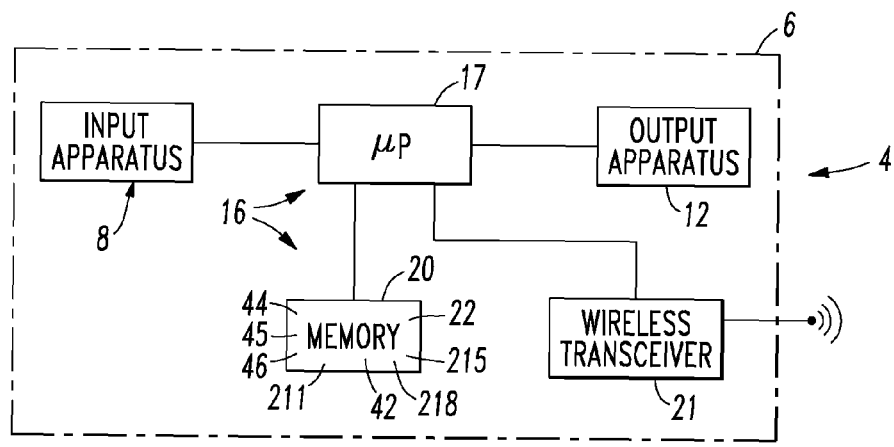
FIG. 1A is a block diagram in schematic form of the wireless handheld electronic device of FIG. 1.

As can be seen in FIG. 1A, the processor apparatus 16 comprises a processor 17 and a memory 20. The processor 17 may be, for instance and without limitation, a microprocessor (µP) that is responsive to inputs from the input apparatus 8 and that provides output signals to the output apparatus 12. The processor 17 interfaces with the memory 20.

The memory 20 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 20 has stored therein the aforementioned number of routines 22 which are executable on the processor 17. The routines 22 can be in any of a variety of forms such as, without limitation, software, firmware, and the like. Some non-limiting example routines include personal information routines 42, a spell checking routine 44, a disambiguation routine 45, and the aforementioned GUI 46, as well as other routines.

As employed herein, the term "reduced keypad" means a keypad or other suitable keyboard in which multiple letters, symbols, and/or digits, and the like, are assigned to any given key. For example and without limitation, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like.

Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

As employed herein, the term "characters" means letters, digits, symbols and the like and can additionally include ideographic characters, components thereof, and the like.

As employed herein, the term "full keypad" means a keypad or other suitable keyboard in which plural letters are not assigned to any given key. Optionally, some of the other keys may have multiple symbols and/or digits, and the like, assigned to each of those other keys.

As employed herein the term "touchpad" means an input apparatus structured using any suitable technology to determine the location of a user's finger (e.g., without limitation, X_Finger, Y_Finger) with respect to two axes (e.g., without limitation, a horizontal axis and a vertical axis; an X axis and a Y axis) of a planar or generally planar surface.

As employed herein the term "contact point" means an output of a touchpad, which output typically includes, for example and without limitation, two coordinates with respect to two axes (e.g., without limitation, a horizontal axis and a vertical axis; an X axis and a Y axis) of a planar or generally planar surface.

As employed herein the term "touch sensor" means an input apparatus structured using any suitable technology (e.g., without limitation, capacitive; resistive; pressure) to determine a degree of user touch of a surface, such as for example, the top of a key associated with a single character or a portion of the top of a key associated with a single character. For example, a capacitive touch sensor is structured to operate by sensing the capacitance of a finger, or the capacitance between sensors. For example, capacitive sensors are laid out along the horizontal and vertical axes of a touchpad. The location of the finger is determined from the pattern of capacitance from these sensors. For example, where plural letters are assigned to any given key, then corresponding plural touch sensors are employed. Alternatively, where a single letter is assigned to any given key, then a single corresponding touch sensor is employed.

EXAMPLE 1

Figure 1B:
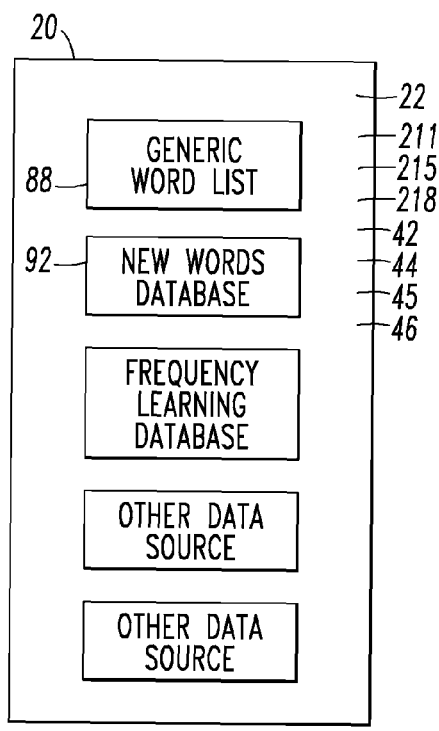
FIG. 1B is a block diagram in schematic form of the memory of the wireless handheld electronic device of FIG. 1A.

Referring to FIG. 2, a keypad processing routine 200 is shown. First, at 202, the routine 200 waits for a key press as determined by the processor 17 of FIG. 1 from a number of inputs from the keypad 24. Next, at 204, it is determined if there were multiple presses of the keys 28. For example, this is done by the operating system (OS) keypad scanner routine 218 (FIG. 1B). If there were no multiple presses of the keys 28 at 204, then at 206, it is determined if the current key press was contemporaneous with the previous key press (i.e., existing, occurring, or originating during the same time, or too close in time, to the previous key press (e.g., without limitation, within 80 mS)). If not, then at 208, the pressed key 28 is accepted before returning to step 202 to wait for the next key press. Hence, in this instance, step 202 determines that a number of the keys 28 were actuated at a first time, steps 204 and 206 determine that only one of those keys 28 was actuated at a later second time, which is greater than a predetermined time (e.g., without limitation, within 80 mS) after the first time, and step 208 responsively outputs a representation of such one of those keys 28.

Otherwise, if either of the conditions at 204 or 206 pass, then this indicates that plural keys 28 were either actuated at the same time or, else, within a predetermined time (e.g., without limitation, within 80 mS) of each other. Next, at 210, it is determined if the X_Finger and Y_Finger combination from the touchpad 26 (as shown in FIG. 1) is found in a key position table 211 (FIG. 1B) (see, for example, Table 1, below; and Examples 3-7). If so, then at 212, FoundKey is set equal to the key 28 from the key position table 211. Otherwise, at 214, since the X_Finger and Y_Finger combination from the touchpad 26 is suitably remote from a suitable two-dimensional "center of gravity" (and/or the central geographic portion and/or the most frequent user-touch position, which can be determined experimentally) of all of the keys 28, then each of the multiple pressed keys 28 from steps 202 and 204 (or 206) is input by a Predictive Input Engine 215 (in the memory 20 of FIG. 1B). For example, the Predictive Input Engine 215 ranks (e.g., without limitation, assigns points, as is discussed in any or all of Examples 8, 9 and 12, below) to each pressed key 28 based upon the number of words being predicted and how common these words are. In turn, the FoundKey is set equal to the key having the maximum point count.

After either 212 or 214, at 216, the FoundKey is accepted and the number of other key presses from steps 202 and 204 (or 206) are either removed or ignored. After 216, execution resumes at step 202 to wait for the next key press.

EXAMPLE 2

At 202 and 204 of FIG. 2, if multiple keys 28 are pressed when a conventional operating system (OS) keypad scanner routine 218 (FIG. 1B) scans the keypad 24, then a Multiple Key Press is reported by that keypad scanner routine 218. Conventionally, such a Multiple Key Press would have been ignored by routine 218 unless one of those keys 28 was, for example, a SHIFT, a CAP or the like. For example, a CAP key indicates whether the 'A' key corresponds to an 'A' (upper case) or an 'a' (lower case). At step 206 of FIG. 2, if the key presses are delayed by so much in time that they get scanned by the keypad scanner routine 218 in two different scanning sequences, then no Multiple Key Press is reported by that routine and both key presses are separately accepted at different instances of step 208. Hence, the routine 200 first checks, at 204, if the keypad scanner routine 218 has reported multiple key presses and, if not, compares, at 206, the time thereof with the time of the last detected key press.

If the condition fails at 206, and if the function (not shown) of the routine 200 is to handle only simultaneous or relatively very close key presses, then it does not take any other action (step 208 is not executed by the routine 200) and execution resumes at 202. Otherwise, if the function of the routine 200 is to handle all key presses, then, as shown, step 208 is executed before returning to step 202. Otherwise, if the condition passes at 206, since there is insufficient delay (e.g., without limitation, less than about 80 ms), then it is assumed that the new and old key presses are a Multiple Key Press.

EXAMPLE 3

Figure 3:
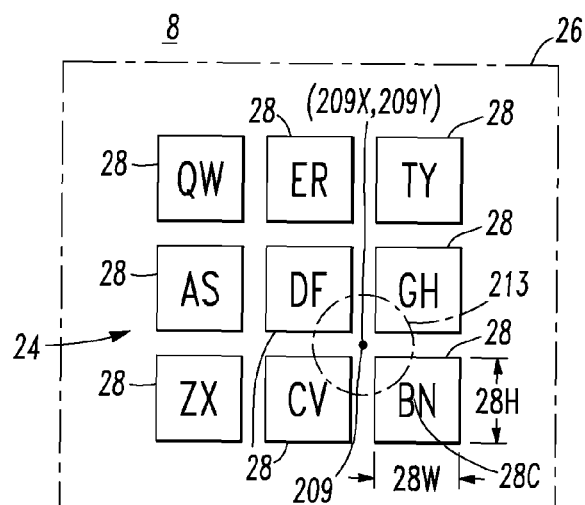
FIG. 3 is a simplified diagram of the touchpad and a portion of the keypad of the input apparatus of FIG. 1A.

FIG. 3 shows the touchpad 26 and a portion of the keypad 24 of the input apparatus 8 of FIG. 1A. The touchpad 26, which is a touch sensitive input component, is disposed between the housing 6 (FIG. 1) and the keys 28 of the keypad 24. The touchpad 26 is structured to provide a contact point 209 responsive to a number of the keys 28 being actuated (e.g., without limitation, keys 'DF', 'GH', 'CV' and 'BN'). As will be discussed, the processor 17 (FIG. 1A) is structured to output, at 216 of FIG. 2, a representation of one of those keys 28 based upon that contact point 209. This provides the predicted word or term arising from: (a) a number of prior presses of the keys 28, and (b) the present press of a plurality of the keys 28. In particular, the example touchpad 26 is disposed under the keypad 24 to sense a first coordinate 209X and a second coordinate 209Y corresponding to the contact point 209.

Step 210 of FIG. 2 provides a suitable border (e.g., at the top, bottom, left and right) of, for example and without limitation, 25% (¼) of the height 28H or width 28W of a corresponding one of the keys 28 with respect to its center 28C. This permits the selection of a particular one of the keys 28 if the X_Finger 209X and Y_Finger 209Y of the contact point 209 from the touchpad 26 is within a suitable border of the central x and y positions (e.g., the two-dimensional "center of gravity"; the central geographic portion; and/or the most frequent user-touch position, which can be determined experimentally; see Table 1 of Example 4, below) for one key 28 in the key position table 211. The 25% margin is an example, which might be changed based on suitable tests done for optimization. That margin depends, for example and without limitation, upon key sizes, key shapes (e.g., without limitation, square; circular; oval; oblong; elliptical; any suitable shape), key spaces, average finger sizes, average angle of the finger on the key 28, and other suitable factors.

EXAMPLE 4

The structure of the example key position table 211 for step 210 of FIG. 2 (using X_Finger 209X and Y_Finger 209Y from the touchpad 26) is shown in Table 1, which shows representative portions of the key position table 211 for a conventional full QWERTY keypad. The x and y values are in any suitable units (e.g., without limitation, a count of units per a corresponding X position distance or Y position distance of the touchpad 26).

TABLE 1

| Key# | KeyChar | x | y |
|---|---|---|---|
| 1 | q | 100 | 100 |
| 2 | w | 200 | 100 |
| 3 | e | 300 | 100 |
| 4 | r | 400 | 100 |
| ... | ... | ... | ... |
| 11 | a | 100 | 200 |
| 12 | s | 200 | 200 |
| 13 | d | 300 | 200 |
| 14 | f | 400 | 200 |
| ... | ... | ... | ... |

Hence, for example, if X_Finger and Y_Finger from the touchpad 26 are 200 and 100, respectively, then Key#2 corresponding to KeyChar w is selected from the key position table 211.

Table 2 shows similar representative portions of another key position table for a conventional reduced QWERTY keypad.

TABLE 2

| Key# | KeyChar | x | y |
|---|---|---|---|
| 1 | qw | 100 | 100 |
| 2 | er | 200 | 100 |
| 3 | ty | 300 | 100 |
| 4 | ui | 400 | 100 |
| ... | ... | ... | ... |
| 11 | as | 100 | 200 |
| 12 | df | 200 | 200 |
| 13 | gh | 300 | 200 |
| 14 | jk | 400 | 200 |
| ... | ... | ... | ... |

EXAMPLE 5

Similarly, assuming that the width 28W and height 28H of the keys 28 are both 80 units and, thus, the example border is 20 (=25% of 80), then if X_Finger and Y_Finger from the touchpad 26 are 420 and 80, respectively, then Key#4/KeyChar r is selected from the key position table 211. This corresponds to the example 25% embodiment of step 210 of FIG. 2.

EXAMPLE 6

Similarly, assuming that the width 28W and height 28H of the keys 28 are both 80 units and, thus, the example border is 20, then if X_Finger and Y_Finger from the touchpad 26 are 350 and 120, respectively, and if a Multiple Key Press involving Key#3/KeyChar e and Key#4/KeyChar r is reported, then the Predictive Input Engine 215 (FIG. 1B) is employed to determine the selected key from those two keys 28.

EXAMPLE 7

Although not shown in Table 1, the example margin discussed above could also be embedded in the key position table 211, instead of being a separate calculation, as shown. Here, for example, instead of a central x and y position in Table 1 along with a separately calculated margin, the key position table 211 could be expanded to include, for each key 28, x_min, x_max, y_min and y_max values. For example, if the width 28W and height 28H of the keys 28 are 80 units and 60 units, respectively, and, thus, the example border is 20 and 15, respectively, then the x_min, x_max, y_min and y_max values for the Key#4/KeyChar r (x=400, y=100 of Table 1) would be 380, 420, 85 and 115, respectively. Here, for example, X_Finger and Y_Finger of 380 and 115, respectively, would be within the margin found in the key position table 211, while X_Finger and Y_Finger of 421 and 84, respectively, would not be found.

EXAMPLE 8

In terms of "points" provided by the Predictive Input Engine 215, this considers both the "number of words predicted" and "how common those words are". As a simple and non-limiting example, if there is a Multiple Key Press involving a text entry application on a reduced QWERTY keyboard, where the user sought to type the word "this", then this would involve presses of four keys 28 including 'TY', 'GH', 'UI' and 'AS'. If, for example, for the last key press, the user pressed both 'QW' and 'AS' keys 28, and if the X_Finger and Y_Finger from the touchpad 26 were not within the margin of any of the keys (x and y) in the key position table 211, then both key presses are fed into the Predictive Input Engine 215 (e.g., without limitation, predictive engine; disambiguation engine (e.g., without limitation, SureType™; T9)). There, for example, the 'QW' key 28 yields two predicted words: "thiq" and "thiw", and the 'AS' key 28 yields three predicted words: "this", "thus" and "thia". Here, the 'AS' key 28 has the advantage of three versus two "number of words predicted" and gets relatively higher points than the 'QW' key. Also, a quick search in the SureType™ word dictionary (e.g., 88) shows, for example, that "this" and "thus" are more common than any of the other example predicted words as discussed above. Hence, the 'AS' key 28 also gets relatively higher points for yielding more common words. Based on the assigned points, the 'AS' key 28 press is selected instead of the 'QW' key 28 press and the predicted words for that key press ("this", "thus" and "thia") are shown to the user.

EXAMPLE 9

Alternatively, the keys 28 may be selected based upon any suitable algorithm involving at least one of the "number of words predicted" and "how common those words are".

EXAMPLE 10

At the start of step 214 of FIG. 2, it is not certain which key 28 is desired out of the set of plural (e.g., without limitation 2, 3, 4 or more) keys 28 in the vicinity of the finger press 213 (FIG. 3). The selection is made, in this example, by the user in a popup lookup screen (not shown), which contains the list of possible words (if word prediction is employed) or word prefix candidates.

In known devices with reduced keypads such as the example reduced QWERTY keypad 24 shown in FIG. 1, when the user presses ambiguous keys, the device considers all the possible character combinations derived from the keys 28 inputted for the word being composed. For instance, when the user presses the keys 28 'AS' and 'ER', the Predictive Input Engine 215 considers four combinations: AE, AR, SE, SR, one of which, generally speaking, constitutes the beginning of the composed word, called a word prefix (although, it could also be a whole word). The Predictive Input Engine 215 finds all possible words in the wordlists (dictionaries) starting with these prefixes, ranks the prefixes according to weighed frequencies, stored in the wordlists, of the corresponding words, and presents the meaningful prefixes (those which can be completed to become words) or the corresponding words in the lookup screen sorted according to their ranks.

If, for example, three two-character keys 28 are pressed, then the count of prefixes will be eight, and the corresponding lookup screen will be built displaying the corresponding list of possible words or word prefix candidates.

When adding the factor of key ambiguity in addition to character ambiguity of keys 28, it is logically equivalent to pressing one big key 28 (e.g., without limitation, a superkey) representing the set of characters combined from all the keys 28 under consideration. For instance, if, after pressing key 'AS', the user presses between keys 'ER' and 'TY', then the latter press can be considered as a press on a so-called superkey 'ERTY'. Therefore, the following combinations will be analyzed by the Predictive Input Engine 215: AE, AR, AT, AY, SE, SR, ST and SY, and the corresponding words will be looked up in the wordlists (dictionaries). In other words, an ambiguous double, triple or quadruple, for example, key press is equated to pressing a superkey with all the characters collected from the keys 28 under consideration. In this example, except for the fact that, perhaps, four, six, eight or more ambiguous characters must be considered, rather than two ambiguous characters, a conventional predictive-input mechanism is employed.

EXAMPLE 11

As an alternative to step 210 of FIG. 2, rather than performing the test for any key 28 found in the key position table 211, the test may be limited to only those multiple keys 28 that were detected at 202 and 204, as being part of the Multiple Key Press.

EXAMPLE 12

As a more specific example than Example 8, a point system for keys 28 could provide a first point value (e.g., without limitation, one point) for every found non-common word, and a different second point value (e.g., without limitation, two points) for every found common word. Hence, in Example 8, where the user intended to type "this" and pressed the 'TY', 'GH' and 'UI' keys and, then, by mistake, pressed both of the 'AS' and 'QW' keys, which yields either: (1) from the 'QW' key, two predicted words: "thiq" and "thiw"; and (2) from the 'AS' key, three predicted words: "this", "thus" and "thia", the point system for feeding those two keys 28 into the Predictive Input Engine 215 is as follows:

For the 'AS' key, the three predicted words: "this", "thus" and "thia" receive 5 points (2, 2 and 1, respectively), since "thia", unlike "this" and "thus", is not a common word found in any of the number of available dictionaries. For the 'QW' key, the two predicted words: "thiq" and "thiw" receive 2 points (1 and 1, respectively), since neither word is a common word. Hence, since the 'AS' key receives relatively more points than the 'QW' key, the 'AS' key is selected to be fed into the Predictive Input Engine 215.

EXAMPLE 13

Referring to FIGS. 4-8, another keypad processing routine 300 (FIG. 8) seamlessly corrects multiple key presses on a physical keypad 24' by making use of a word list (e.g., generic word list 88 and/or new words database 92) in the memory 20 of FIG. 1B along with, for example, touch sensors 27' on the keypad keys 28' (e.g., on the key caps). For example, on top of each key cap, a touch sensor 27' is added to provide data regarding the key press and the area of intended contact. Then, for example, the key presses immediately preceding a new key press are processed in a suitable word checker algorithm (e.g., analogous to a SureType™ algorithm at 312) to make a decision on the user-intended key press.

In this example, the keypad 24' is a full keypad (e.g., without limitation, a full QWERTY keypad) in which plural letters are not assigned to any one of the keys 28'. Alternatively, a reduced keypad may be employed. In that instance, a touch sensor (e.g., 27') is employed for each of the characters of those keys. Except for the keypad 24' and the touch sensors 27', the handheld electronic device 4' may be generally the same or similar to the handheld electronic device 4 of FIG. 1, which has the keypad 24 and the touchpad 26. Hence, for FIGS. 4 and 5, the corresponding input apparatus 8 (FIG. 1A) includes the keypad 24' and the touch sensors 27'.

For example, data is potentially taken from one, some or all of the eight surrounding keys (e.g., W, E, R, S, F, Z, X and C) and the intended key (e.g., D) as shown in FIGS. 4-7.

Figure 4:
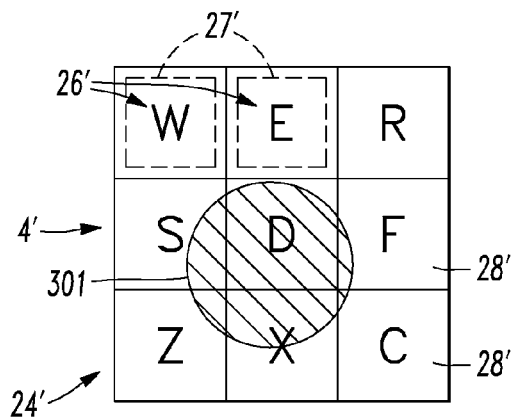
FIGS. 4 and 5 are simplified plan views of portions of a keypad and touch sensors during a key press in accordance with other embodiments of the disclosed and claimed concept.

FIG. 4 shows the area on the keypad 24' of the physical key press 301, which involves six (S, D, F, Z, X and C) of the nine potentially relevant keys 28', it being appreciated that additional keys (not shown) are employed, as is conventional. In this example, a touch sensitive input component 26' is disposed on each of the keys 28'. Here, the touch sensitive input component 26' is a plurality of the touch sensors 27', which are structured to provide a number of responses 31' (FIG. 6) to a processor (e.g., processor 17 of FIG. 1A). As will be discussed, below, in connection with FIG. 8, the processor 17 is structured to output, at 316, a representation of a character based upon those responses 31'. This provides the best possible key (e.g., the user's intended key) (or characters of a key, if a reduced keypad (not shown) is employed) arising from the present press of a plurality of the keys 28', as determined if the resultant word or term (as defined by: (a) a number of prior presses of the keys 28', and (b) the present press of the plurality of the keys 28') is in a suitable word dictionary (e.g., 88 or 92).

Figure 6:
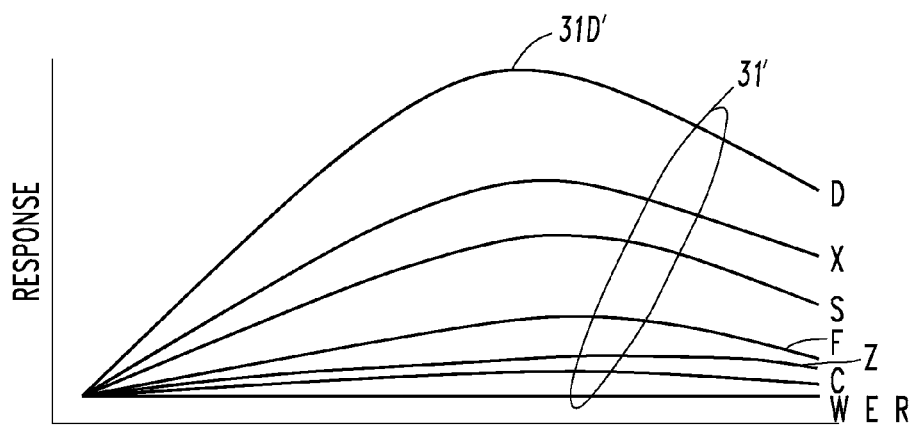
FIGS. 6 and 7 are plots of the responses of the touchpads versus time for the keypads of FIGS. 4 and 5, respectively.

FIG. 6 shows the responses 31' versus time of the corresponding touch sensors 27'. Here, the user has previously typed "HEA" and the current key press provides the letter "D" as is best shown by the maximum peak response 31D' in FIG. 6. This provides the term "HEAD". The verification step is whether "HEAD" is in the device's dictionary (e.g., word list). If so, then the resulting word is, in fact, "HEAD".

Figure 5:
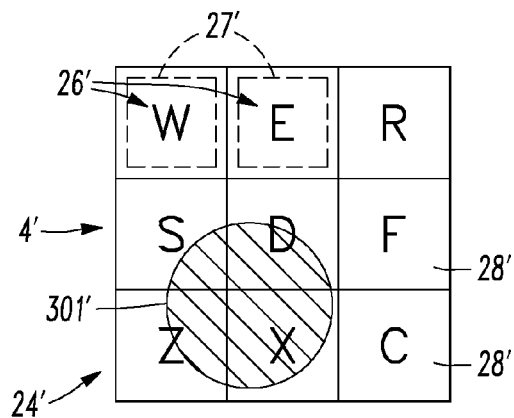
Figure 7:
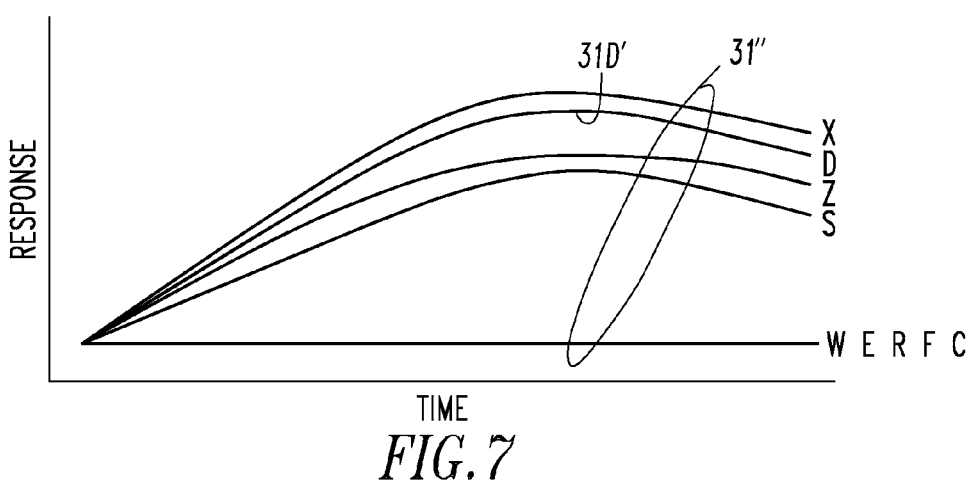

The foregoing is contrasted with FIG. 5, which shows the area on the keypad 24' of a physical key press 301' involving four (S, D, Z and X) of the nine potentially relevant keys 28'. FIG. 7 shows the responses 31" versus time of the corresponding touch sensors 27'. Here, the user has previously typed "HEA" and the current key press provides the letter "X" as is best shown in FIG. 7. This provides the term "HEAX". The verification step is whether "HEAX" is in the device's dictionary (e.g., word list). Here, since this term is not in the dictionary, then the next best key press from FIG. 7 is the letter "D" as is best shown by the next best maximum peak response 31D" in FIG. 7. The verification step is then repeated to determined whether "HEAD" is in the device's dictionary (e.g., word list). If so, then the resulting word is, in fact, "HEAD".

Figure 8:
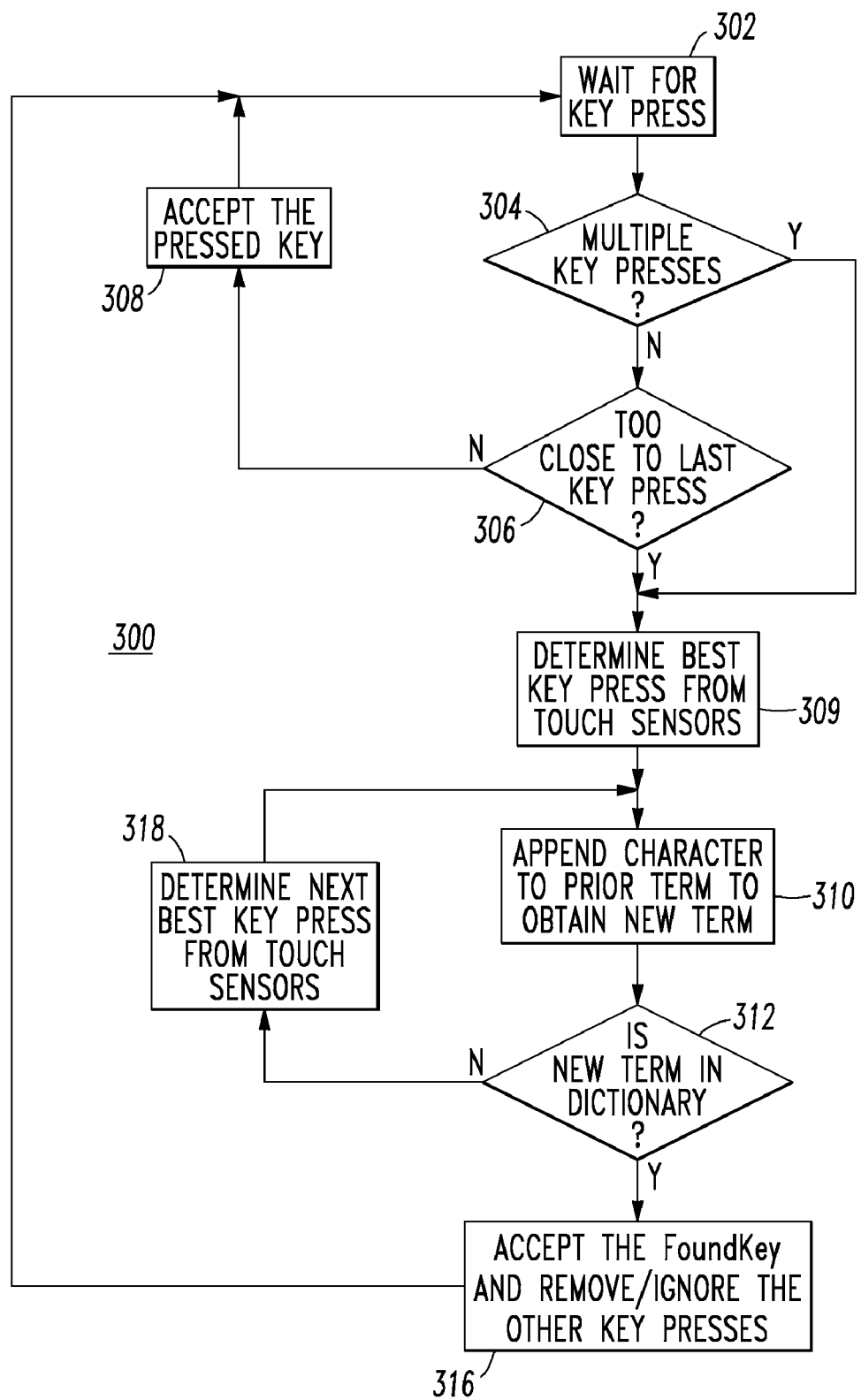
FIG. 8 is a flowchart of another keypad processing routine of the processor of the wireless handheld electronic device of FIG. 1A in accordance with another embodiment of the disclosed and claimed concept.

Referring to FIG. 8, at 302 and 304, if multiple keys 28' are pressed when the operating system (OS) keypad scanner routine 218 (FIG. 1B) scans the keypad 24', then a Multiple Key Press is reported by that keypad scanner routine 218. At step 306 of FIG. 8, if the key presses are delayed by so much in time that they get scanned by the keypad scanner routine 218 in two different scanning sequences, then no Multiple Key Press is reported by that routine and both key presses are separately accepted at different instances of step 308. Even steps 302-306 are similar to respective even steps 202-206 of FIG. 2. Thus, at the input to 308, plural keys 28' were either actuated at the same time or, else, within a predetermined time (e.g., without limitation, 80 mS) of each other.

At 309, the best key press of the touch sensors 27' is determined from the maximum response shown in FIG. 6 (e.g., character "D") or 7 (e.g., character "X"). Then, at 310, that character is appended to any prior term to obtain a new term (e.g., if the user has already typed "HEA" and the current key press provides the letter "X" then this provides the term "HEAX"). Next, at 312, the verification step is whether the new term (e.g., "HEAX") is in the device's dictionary (e.g., word list 88 and/or new words database 92). If so, then the best key press from 309 is accepted as FoundKey and the other key presses (as determined at 304 or 306) are removed or ignored. Finally, step 302 is repeated. Otherwise, if the new term was not in the dictionary, at 312, then, at 318, the next best key press is determined (e.g., from the second best maximum response shown in FIG. 7, which provide the character "D"). Then, steps 310 and 312 are repeated to determine if the new term is in the device's dictionary.

EXAMPLE 14

The touch sensors 27' may use a wide range of suitable technology (e.g., without limitation, capacitive sensors; resistive sensors; any suitable type of touch sensor). As a non-limiting example, FIGS. 4 and 5 show resistive sensors 27'.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A handheld electronic device comprising:
   a housing including a surface;
   a first input component comprising a plurality of input members disposed external to the surface of said housing;
   a second touch sensitive input component disposed about the input members of said first input component, said second touch sensitive input component being separate and distinct from said input members and said first input component and being structured to provide a number of responses responsive to actuation of a number of said input members; and
   a processor cooperating with said first input component and said second touch sensitive input component to determine if a plurality of said input members are actuated contemporaneously and to output a representation of a single one of said input members based upon said number of responses,
   wherein said second touch sensitive input component is a plurality of touch sensors being structured to provide said number of responses, said representation is a first representation selected from the best one of said number of responses;
   wherein said processor comprises a memory storing a word dictionary and a routine, said routine being structured to provide a second representation of a first term formed from a number of previous actuations of a number of said input members and said first representation; and
   wherein said routine is further structured to select a third representation selected from the next best one of said number of responses, to provide a fourth representation of a different second term formed from said number of previous actuations and said third representation, and to output said third representation if said different second term is found in said word dictionary.

2. The handheld electronic device of claim 1 wherein said first input component is a keypad; and wherein said input members are a plurality of keys of said keypad.

3. The handheld electronic device of claim 2 wherein said keypad is a reduced keypad in which each of at least a portion of the keys have a plurality of letters assigned thereto.

4. The handheld electronic device of claim 1 wherein said first input component is a full keypad; wherein said input members are a plurality of keys of said full keypad; and wherein a plurality letters are not assigned to any one of the keys.

5. The handheld electronic device of claim 1 wherein said processor is structured to determine if a plurality of said input members are actuated at the same time or within about a predetermined time of each other.

6. A handheld electronic device comprising:
   a housing including a surface;
   a first input component comprising a plurality of input members disposed external to the surface of said housing;
   a second touch sensitive input component disposed about the input members of said first input component, said second touch sensitive input component being separate and distinct from said input members and said first input component and being structured to provide a contact point with respect to the surface of said housing responsive to actuation of a number of said input members; and
a processor cooperating with said first input component and said second touch sensitive input component to determine if a plurality of said input members are actuated contemporaneously and to output a representation of a single one of said input members based upon said contact point,
wherein said second touch sensitive input component is disposed between said housing and the input members of said first input component and said second touch sensitive input component is structured to provide said contact point, and wherein said processor is structured to output said representation based upon said contact point,
wherein said processor is structured to determine that said contact point is remote from all of said input members, and wherein said processor comprises a predictive input routine structured to employ an identification of said plurality of said input members that are actuated contemporaneously in order to output said representation of the single one of said input members based upon said identification,
wherein said predictive input routine is further structured to evaluate said plurality of said input members that are actuated contemporaneously based upon at least one of: (a) a count of words being predicted from each of said plurality of said input members that are actuated contemporaneously, and (b) a measure of common usage of said words, and
wherein said predictive input routine is further structured to provide a first point value for each of the words being predicted from each of said plurality of said input members that are actuated contemporaneously, and a second point value for each of the last said words which are found in a dictionary; and wherein said predictive input routine is further structured to output the representation of the single one of said input members based upon the largest sum, for each of said plurality of said input members that are actuated contemporaneously, of: (a) the first point value of each of the words being predicted of a corresponding one of said plurality of said input members that are actuated contemporaneously, and (b) the second point value of each of the last said words which are found in said dictionary of the corresponding one of said plurality of said input members that are actuated contemporaneously.

* * * * *